Dec. 2, 1958 W. STELZER 2,862,364
BOOSTER BRAKE MECHANISM
Filed Dec. 6, 1956 2 Sheets-Sheet 1

INVENTOR
WILLIAM STELZER
John V. Phillips ATTORNEY

Dec. 2, 1958 W. STELZER 2,862,364
BOOSTER BRAKE MECHANISM
Filed Dec. 6, 1956 2 Sheets-Sheet 2

INVENTOR
WILLIAM STELZER

BY John F. Phillips
ATTORNEY

United States Patent Office 2,862,364
Patented Dec. 2, 1958

2,862,364

BOOSTER BRAKE MECHANISM

William Stelzer, Bloomfield Hills, Mich., assignor to Kelsey-Hayes Company, a corporation of Delaware Application December 6, 1956, Serial No. 626,736

20 Claims. (Cl. 60—54.5)

This invention relates to a booster brake mechanism for motor vehicles.

Numerous types of booster brake mechanisms have been developed which are quite satisfactory in operation. In all of these mechanisms it is necessary to mechanically move or hydraulically displace a control piston or other element for energizing the booster motor to cause the follow-up action of the booster motor piston relative to the brake pedal of the vehicle. In the most desirable types of booster brake mechanisms, an initially relatively "soft" pedal is provided whereby the brake pedal may be moved relatively easily from its normal off position. In later stages of brake operations, the brake pedal is subjected to progressively increasing reactions so that the operator "feels" a resistance proportionate to the degree of application of the brake pedals.

In a mechanism of this type, resistances to movement of the pedal-operated control mechanism which are undesirable are encountered. For example, where a valve mechanism is directly operated by the brake pedal there usually are sliding elements which are dry and thus subject to appreciable and non-uniform frictions. In other types of mechanisms, energization of the booster motor is effected by displacement of a piston by pedal generated hydraulic pressures. Such pistons, in various types of mechanisms, frequently require two or more deformable seals to prevent leakage of the hydraulic fluid past the pistons. Such seals are subject to being wetted at one end of the piston by fluid in a hydraulic chamber, and the opposite ends of the pistons operate in a dry chamber. Accordingly, the deformable seals are not kept wet and consequently flexible and relatively frictionless, and dry seals of this type, therefore, also introduce undesirable frictional resistances to pedal-effected movements of the parts.

An important object of the present invention is to provide a mechanism of the character referred to wherein substantially frictionless movement of the valve operating parts is provided, thus eliminating the transmission to the brake pedal of all resistance forces except those which are intended and desirable.

A further object is to provide such a mechanism wherein a valve operating mechanism is provided in the form of a plunger movable by hydraulic pressure applied from one side thereof, and at the other side of which plunger is a hydraulic chamber, whereby the deformable leakage seal carried by the plunger is kept wet and substantially frictionless at all times.

A further object is to provide such an apparatus having means for returning any leakage fluid from the second chamber referred to, to a hydraulic reservoir, for example the reservoir of a master cylinder.

A further object is to provide novel means for transmitting movement of the displaceable plunger referred to, to the valve mechanism to energize the motor.

A further object is to provide in combination with the mechanism referred to a novel device for applying a multi-stage reaction resistance acting against the displaceable valve operating plunger so as to build up hydraulic reactions throughout the range of brake operation.

A further object is to provide a novel construction of the character referred to wherein all sliding parts which are movable to provide valve actuation and to transmit hydraulic reaction to the brake pedal are immersed in pedal fluid, thus maintaining the seals thoroughly lubricated to eliminate unnecessary and undesirable resistances.

Other objects and advantages of the invention will become apparent during the course of the following description.

In the drawings I have shown one embodiment of the invention. In this showing:

Figure 1:
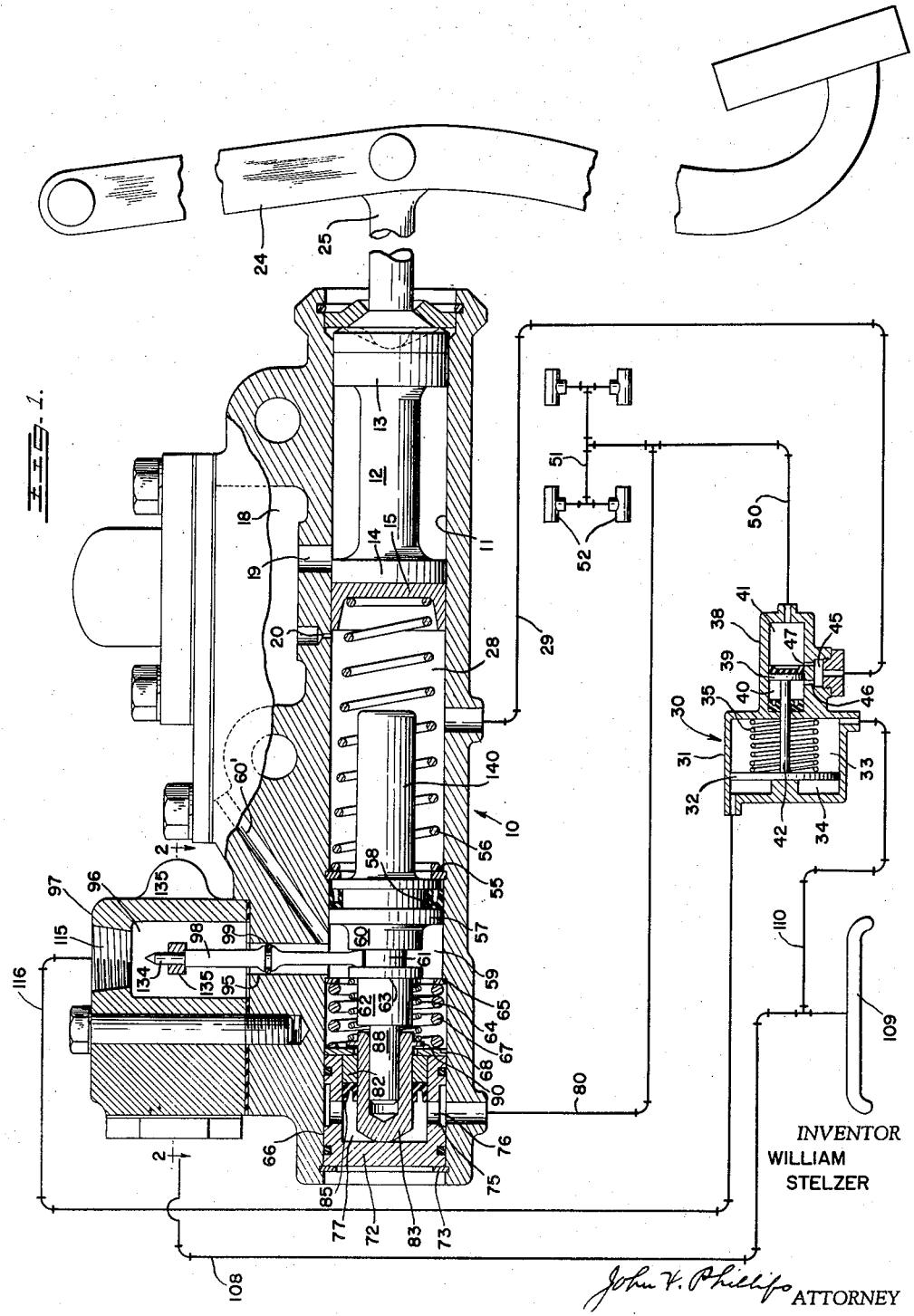
Figure 1 is a sectional view, partly in elevation, showing a pedal operable master cylinder and the valve operating and hydraulic reaction parts associated therewith, together with the valve operating lever means, other elements of the system being diagrammatically shown.

Referring to Figure 1, the numeral 10 designates a preferably die-cast body provided with an elongated cylinder 11. A plunger 12 is mounted in the cylinder 11 and is provided at one end with a head 13 and at its other end with a head 14 provided with a lipped cup 15 such as is commonly employed with master cylinders, the cylinder 11 and plunger 12 in fact constituting in themselves a conventional master cylinder.

The body 10 is provided with a conventional reservoir 18 having an opening 19 for supplying fluid back of the head 14, and having a replenishing port 20 just ahead of the seal 15 as is customary in conventional pedal operated master cylinders. A conventional pedal 24, shown in the present instance as a hanging pedal, is connected by a rod 25 to the plunger head 13 to impart movement to the plunger 12 to move it to the left in Figure 1.

To the left of the seal 15 in Figure 1 is a master cylinder chamber 28 from which leads a hydraulic line 29. This line supplies fluid to a booster motor diagrammatically shown and indicated as a whole by the numeral 30. The motor is shown as comprising a cylinder 31 having a piston 32 dividing it to form a constant pressure chamber 33 and a variable pressure chamber 34, and the piston 32 is biased to its normal off position by a spring 35.

Projecting axially from the cylinder 31 is a housing 38 forming a cylinder in which is arranged a plunger 39 dividing such cylinder to form a primary chamber 40 and a secondary chamber 41. The plunger 39 is connected to the piston 32 by a rod 42.

The hydraulic line 29 is connected to a chamber 45 associated with the housing 38 and communicating with the chambers 40 and 41 respectively through ports 46 and 47. The secondary chamber 41 is connected by hydraulic lines 50 and 51 to the wheel cylinders 52 of the vehicle. It will be apparent that when the plunger 12 is operated, fluid will be displaced through line 29 into chamber 45 and thence through port 47 and chamber 41 through lines 50 and 51 to the wheel cylinders. In accordance with conventional practice so far as the motor is concerned, initial movement of the plunger 39 closes the port 47 whereupon master cylinder pressures act in the chamber 40 to assist the motor 30 in operating the plunger 39.

At a point spaced to the left in Figure 1 a substantial distance from the cup 15, the interior of the cylinder 11 carries a snap ring 55. The return spring 56 seats at one end against the snap ring 55 and at its other end against the cup 15 to bias the plunger 12 to the normal off position shown in Figure 1.

A plunger 57 is slidable in the cylinder 11 and normally engages the snap ring 55 to limit the movement of the plunger 57 to the normal off position shown. The plunger 57 is sealed with respect to the cylinder 11, and this may be accomplished by a single preferably double-lipped seal 58.

To the left of the plunger 57 in Figure 1 is formed a chamber 59 which communicates through a passage 60' with the reservoir 18. Accordingly, hydraulic brake fluid is always present in the chamber 59, and the seal 58 is therefore kept wet from both sides of the plunger 57, thus rendering the use of a single seal 58 efficient as a sealing means. The maintenance of the seal in wet condition substantially eliminates friction between the seal and the wall of the cylinder 11, thus rendering the plunger 57 easily movable to the left to operate the brake mechanism in the manner to be described.

An axial projection 60 formed on the plunger 57 extends to the left thereof as viewed in Figure 1 and is provided with an annular groove 61 for a purpose to be described. At the left of the projection 60, the plunger 57 is further reduced as at 62 to form a shoulder 63 against which seats one end of a return spring 64, further referred to below. A stop ring 65 is arranged in the left-hand end of the cylinder 11 and engages a shoulder formed between such cylinder and a slightly enlarged cylindrical bore 66. A spring 67, substantially heavier than the spring 64, seats at one end against the stop ring 65 and at its opposite end against a disk 68, further described below.

In the outer end of the bore 66 is arranged a closed-ended sleeve 72 maintained in position by a snap ring 73 and sealed in the bore 66, preferably by O-rings as shown. The sleeve 72 is provided with an annular groove 75 communicating through ports 76 with a chamber 77 formed within the sleeve 72. The annular groove 75 communicates with one end of a line 80 tapped into the line 50 as shown in Figure 1. The right-hand end of the sleeve 72 engages the stop ring or disk 68 as shown, the sleeve 72 thus limiting movement of the disk 68 to the left to the normal position shown in Figure 1.

A cylindrical plunger 82 is slidable in the sleeve 72 and surrounds and is slidable with respect to an inner closed-ended sleeve 83. The cylindrical plunger 82 is sealed relative to the sleeves 72 and 83 by a double-lipped seal 85.

The sleeve 83 is bored to receive a pilot 88 extending axially from the plunger portion 62. The pilot 88 forms with the plunger portion 62 a shoulder normally spaced from the adjacent end of the sleeve 83 for a purpose to be described. The sleeve 83 is provided with an external flange 90 against which seats the adjacent end of the spring 64. This spring therefore acts as a return spring for the plunger 57 to maintain it normally in engagement with the snap ring 55. This spring also acts to the left against the sleeve 83 to tend to maintain the closed end of such sleeve in its normal position in engagement with the end of the sleeve 72.

The body 10 is provided with a vertically extending opening 95 communicating at its lower end with the chamber 59 and opening at its upper end into a variable pressure chamber 96 formed in a valve casing 97. A lever 98 has its upper end arranged in the chamber 96 and has its lower end rounded and engaging against opposite sides of the groove 61. Intermediate its ends, the lever 98 is grooved to receive an O-ring 99 fitting in the opening 95 to act as a seal in such opening and also acting as a fulcrum for the lever 98.

Figures 2, 3:
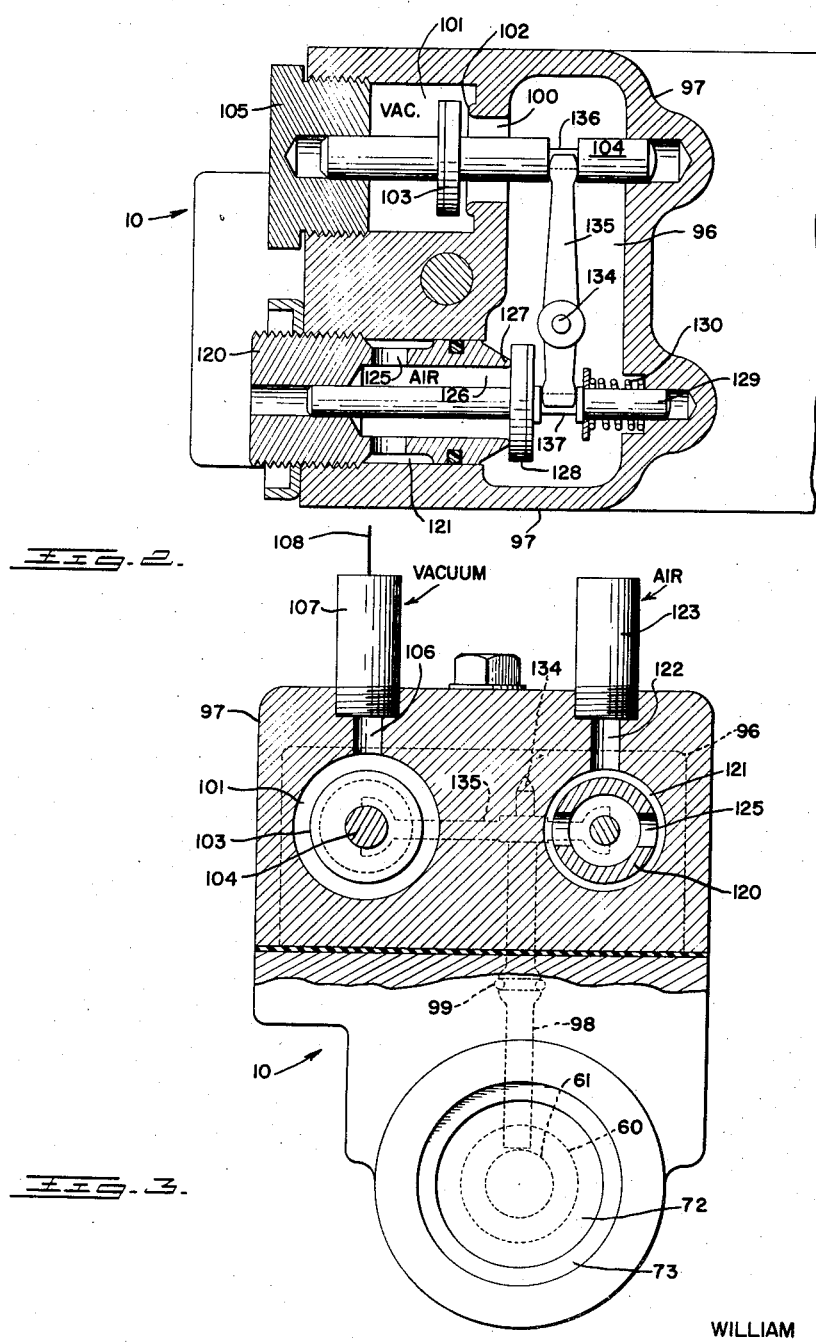
Figure 2 is a section on line 2—2 of Figure 1.
Figure 3 is an end elevation of the device, parts being shown in section.

Referring to Figure 2, a port 100 communicates with the chamber 96 and normally communicates with a vacuum chamber 101 through a valve seat 102. A normally open valve 103 is engageable with the seat 102 and is carried by a stem 104 slidably supported at one end by the housing 97 and at its other end by a nut 105. The chamber 101 (Figure 3) is provided with a port 106 to which is connected a nipple 107. This nipple, in turn, is connected to a vacuum line 108 (Figure 1) leading to the source of vacuum such as the intake manifold 109 of the vehicle engine. A branch line 110 is connected between the line 108 and the constant pressure motor chamber 33 (Figure 1) to maintain vacuum therein at all times. The variable pressure chamber 96 (Figure 1) is provided with a port 115 connected to one end of a line 116, the other end of which is connected to the variable pressure motor chamber 34. With the valve 103 (Figure 2) open, the vacuum chamber 101 communicates with the variable pressure chamber 96, and through the line 116, therefore, vacuum will be maintained in the motor chamber 34 to vacuum-suspend the motor piston 32.

Into the valve housing 97 is threaded a sleeve 120 (Figure 2) provided with a groove forming a chamber 121 (Figure 3) open to the atmosphere through a port 122 and nipple 123, to the latter of which is preferably connected an air cleaner (not shown). The chamber 121 (Figure 2) communicates through ports 125 with an air chamber 126 formed in the sleeve 120 and terminating at its inner end in a valve seat 127. This seat is normally engaged by an air valve 128 carried by a stem 129 slidably supported at its ends by the valve housing 97 and sleeve 120, as shown. A spring 130 biases the air valve 128 to closed position.

The upper end of the lever 98 is provided with a reduced extension 134 projecting through and forming a fulcrum for a valve operating lever 135. The ends of such lever are yoked for engagement respectively in grooves 136 and 137 formed in the stems 104 and 129. It will be apparent that when the lever projection 134 moves to the right in Figures 1 and 2, movement will be imparted to the lever 135, which movement closes the valve 103 and opens the valve 128, as further described below.

For emergency operation of the plunger 57 in the event of a failure in pressure in the chamber 28, the plunger 57 is provided at the right end thereof with an axial extension 140 engageable by the plunger cup 15. This feature forms no part per se of the present invention but is disclosed and claimed in my copending application Serial No. 602,259, filed August 6, 1956.

*Operation*

The parts normally occupy the positions shown in the drawings. When the brake is to be operated, the pedal 24 is depressed, thus moving the plunger 12 to the left in Figure 1 to build up pressure in the master cylinder chamber 28. Fluid will flow through line 29 into chamber 45, thence through port 47 into chamber 41, and to the brake cylinders through lines 50 and 51. It is pointed out that the plunger 39 is of the type now commonly employed wherein initial movement of the plunger 39 when the motor 30 is energized will close the port 47, but wherein fluid can flow through port 46 into chamber 40 and bypass the piston 39 so long as pressure is no higher in the chamber 41 than in the chamber 40. Pressure built up in the chamber 28 displaces the plunger 57 to the left of its position shown in Figure 1. This operation takes place with substantially negligible resistance, the plunger 57 moving against the tension of the light spring 64. This constitutes the first stage of operation and because of the lack of reaction, the apparatus provides a higher desirable "soft" pedal. Movement of the plunger 57 to the left swings the lower end of the lever 98 to the left and the upper end of the lever 98 will move to the right to impart similar movement to the lever 135 at the fulcrum thereof. Since the biasing spring 130 (Figure 2) offers resistance to the adjacent end of the lever 135, the opposite end of the lever will move to close the vacuum valve 103. The fulcrum of the lever 135 preferably is relatively close to the air valve stem 129, and accordingly the long lever arm of the lever 135 associated with the vacuum valve stem 104 imparts rapid movement thereto to close the valve 103. Thus the vacuum chamber 101 will be immediately disconnected from the variable pressure chamber 96.

A slight further movement of the fulcrum of the lever 135 to the right will then move the stem 129 in the same direction to open the valve 128. Thus air will flow into the variable pressure chamber 96 and through line 116 (Figure 1) to the variable pressure chamber 34 of the motor 30. Accordingly the piston 32 will move to the right in Figure 1 to generate pressure in the chamber 41, assisted by pedal generated pressures in the chamber 40, to apply the brakes.

Obviously, pressure generated in the brake cylinders 52 will be communicated through line 80 to the chamber 77. Shortly after energization of the motor, and after hydraulic pressure in chamber 77 has increased, pressure in the chamber 77 will move the sleeve 83 toward the right against the relatively light tension of the spring 64, the sleeve 83 thereupon solidly engaging the plunger portion 62 to apply a hydraulic reaction to the chamber 28 to increase resistance to movement of the brake pedal 24. The area of the sleeve 83 being relatively small, the hydraulic reaction will be correspondingly small. This reaction, however, is appreciable although comparatively light, and constitutes the second stage of operation in the apparatus.

At a later stage in the brake operation, hydraulic pressures will further increase in the chamber 77, and such pressures applied to the cup 85 will move the cylindrical plunger 82 to the right in Figure 1, carrying with it the stop member 68 which will be moved against the compression of the spring 67. This spring is designed to be overcome at any desired hydraulic pressure in the chamber 77, preferably corresponding to the point in brake operation where the brake shoes engage the brake drums. Movement of the cylindrical plunger 82 referred to causes the stop member 68 to engage the flange 90. At such time, therefore, the pressure affecting the total areas of the cylindrical plunger 82 and sleeve 83 will be applied against the plunger 57 and through the fluid in the chamber 28 to the master cylinder plunger 12. This reaction will be felt by the operator, and will provide greater resistance to movement of the brake pedal 24 throughout the greater portion of the range of brake application after actual engagement of the brake shoes with the drums has taken place.

The heavier reaction occurring when the sleeve 83 and plunger 82 have their total areas subjected to the further increased pressures in the chamber 77 constitutes the third stage of operation of the apparatus. By breaking the reaction down into three stages as described, the transition from the first to the third stages is not noticeable, the operator feeling a progressively increasing reaction. Of course, the pressure in the chamber 77 and consequently the reaction continues to increase throughout the remainder of a continued and increasing foot pressure against the pedal 24.

The present construction combines the valving and reaction means for the booster motor with the master cylinder to substantially simplify the construction. Moreover, hydraulic fluid is always present in the chambers 28, 59 and 77 to maintain the seals 58 and 85 constantly in a wet condition. Accordingly it is necessary only to use one seal for the plunger 57 and one for the cylindrical plunger 82, the wet condition of the seals rendering them highly effective in performing their sealing operation. In addition, the wet condition of the seals reduces the friction of such seals to a negligible point. Accordingly, it will be apparent that the reciprocating parts associated with the master cylinder are subjected almost wholly only to the forces which it is desired to transmit thereto. The operation of the mechanism, therefore, is extremely smooth and a modulated action is provided in which the negligible frictions are constant.

Any leakage of fluid past the seals 58 and 85 into the chamber 59 will be taken care of by the passage 60', the leakage fluid merely being returned to the reservoir 18. Pressure in the chamber 59 will always be at that of the atmosphere, but the chamber will remain at all times full of hydraulic fluid to maintain the seals in wet condition.

Pressures vary in the chamber 96, of course, but the O-ring 99 effectively seals the opening 95 against leakage of fluid into the chamber 96.

It will be noted that the valve mechanism is combined with the reaction means in a novel manner which renders the valve mechanism simple in construction and installation and highly responsive to movements of the plunger 57. The valve mechanism obviously provides an accurate follow-up action of the motor piston 32 relative to movement of the brake pedal 24.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster mechanism comprising a cylinder, a control plunger slidable therein, an actuating plunger slidable in said cylinder and spaced from said control plunger to form a hydraulic chamber in which pressure is generated by movement of said actuating plunger to move said control plunger, reaction plunger means in said cylinder at the end thereof opposite said actuating plunger and forming with said control plunger an intermediate chamber, means biasing said reaction plunger means to a normal position disengaged from said control plunger, a reaction chamber in the end of said cylinder adjacent said reaction plunger means, a motor, a control mechanism connected between said motor and a source of power therefor, means projecting into said intermediate chamber and engaging and operable by said control plunger, such means being connected to said control mechanism to operate it, a hydraulic pressure cylinder, a power plunger movable in such cylinder and connected to said motor to be operated thereby to generate pressure in said hydraulic pressure cylinder for the performance of work, means connecting said hydraulic pressure cylinder to said reaction chamber to transmit pressures to the latter to operate said reaction plunger means to oppose movement of said control plunger from its normal off position, and means connected to transmit pressure from said hydraulic chamber to said power plunger to assist said motor in operating such plunger.

2. A mechanism according to claim 1 wherein said control plunger and said reaction plunger means are provided with sealing cups exposed to hydraulic fluid in said first-named chamber and in said reaction chamber, and means for supplying hydraulic fluid to said intermediate chamber to maintain said sealing means wet with hydraulic fluid.

3. A mechanism according to claim 1 wherein said control plunger and said reaction plunger means are provided with sealing cups exposed to hydraulic fluid in said first-named chamber and in said reaction chamber, a hydraulic reservoir, and a passage connecting said reservoir to said intermediate chamber to supply fluid thereto to subject the adjacent sides of said sealing cups to hydraulic fluid to assist in maintaining them in a wet condition.

4. A mechanism according to claim 1 wherein said motor is a fluid pressure motor and said control mechanism is a control valve mechanism controlling communication of said motor with sources of relatively high and low pressures, said control valve mechanism having a control chamber to which said motor is connected and the pressure in which is controlled by said valve mechanism, a passage connecting said intermediate chamber to said control chamber, said means engaging said control plunger comprising a lever projecting through said passage, and means sealing said passage around said lever against the escape of hydraulic fluid from said intermediate chamber to said control chamber.

5. A booster mechanism comprising a motor, a control mechanism connected between said motor and a power source, a pressure chamber, a fluid displacing element connected to said motor and operable in said chamber to displace hydraulic fluid therefrom to perform work, a primary chamber back of said fluid displacing element, a cylinder, a first plunger, a second plunger and reaction plunger means all arranged in said cylinder, said first and second plungers being spaced to form a hydraulic chamber connected to said primary chamber and from which fluid is displaced upon movement of said first plunger, said second plunger and said reaction plunger means being spaced to form an intermediate chamber in which hydraulic fluid is maintained, a reaction chamber in the end of said cylinder opposite said first plunger connected to said pressure chamber, said reaction plunger means being exposed to said reaction chamber, said second plunger being movable by pressure in said hydraulic chamber toward said reaction plunger means, means biasing said reaction plunger means away from said second plunger, said reaction plunger means being movable toward and engageable with said second plunger under the influence of hydraulic pressure in said reaction chamber to oppose such movement of said second plunger, and operating means connected between said second plunger and said control mechanism to operate the latter and connect said motor to said power source upon said movement of said second plunger.

6. A mechanism according to claim 5 provided with a reservoir, and a duct connecting said reservoir to said intermediate chamber to maintain it full of hydraulic fluid.

7. A mechanism according to claim 5 wherein said second plunger and said reaction plunger means are provided with deformable seals to seal said hydraulic chamber and said reaction chamber from said intermediate chamber, and means for maintaining said intermediate chamber full of hydraulic fluid to assist in maintaining said seals in a wet condition.

8. A mechanism according to claim 5 wherein said reaction plunger means comprises a pair of reaction plungers one within the other, spring means biasing the inner plunger of said pair and said second plunger away from each other to tend to hold them in normal off positions, and stronger spring means biasing the outer plunger of said pair away from said second plunger to a normal off position.

9. A mechanism according to claim 5 wherein said motor is a fluid pressure motor and said control mechanism is a control valve mechanism for controlling the connection of said motor to sources of different pressures, a control chamber connected to said motor and connected to said valve mechanism, an operating lever for said valve mechanism having one end arranged in said intermediate chamber and engaging said second plunger and having its other end arranged in said control chamber, and means for supporting said lever for rocking movement and for sealing said intermediate chamber from said control chamber.

10. A booster mechanism comprising a fluid pressure motor having a variable pressure chamber and a pressure responsive unit exposed to pressure in said chamber, a hydraulic pressure generating device having a plunger dividing it to form a primary and secondary chambers, said plunger being connected to said pressure responsive unit to displace fluid from said secondary chamber to perform work, a valve mechanism comprising a normally open valve connected to a source of low pressure, a normally closed valve connected to a source of higher pressure connected to said valve mechanism and to said motor, a control chamber, operating means for said valve mechanism having a normal position from which it is movable to close said first-named valve and open said second-named valve to said control chamber, a cylinder, a first plunger, a second plunger and reaction plunger means all arranged in said cylinder, said first and second plungers being spaced to form a hydraulic chamber connected to said primary chamber and from which fluid is displaced upon movement of said first plunger, said second plunger and said reaction plunger means being spaced to form an intermediate chamber, a reaction chamber in the end of said cylinder opposite said first plunger and connected to said secondary chamber, said reaction plunger means being exposed to said reaction chamber, said second plunger being movable by pressure in said hydraulic chamber toward said reaction plunger means, means biasing said reaction plunger means away from said second plunger, said reaction plunger means being movable toward and engageable with said second plunger under the influence of hydraulic pressure in said reaction chamber to oppose such movement of said second plunger, and motion transmitting means connected between said second plunger and said operating means to move the latter upon said movement of said second plunger.

11. A mechanism according to claim 10 provided with a passage connected between said intermediate chamber and said control chamber, said motion transmitting means comprising a lever projecting through said passage, and means for supporting said lever intermediate its ends for rocking movement in said passage.

12. A mechanism according to claim 10 wherein said second plunger and said reaction plunger means are provided with deformable pressure seals to seal said intermediate chamber from said hydraulic chamber and from said reaction chamber, means for maintaining hydraulic fluid in said intermediate chamber, a passage connected between said control chamber and said intermediate chamber, said motion transmitting means comprising a lever projecting through said passage, and means for supporting said lever intermediate its ends for rocking movement in said passage and for pressure sealing said control chamber and said intermediate chamber from each other.

13. A mechanism according to claim 10 wherein said reaction plunger means comprises a pair of plungers having normal positions in which they have lost motion connection with said second plunger, a relatively light spring biasing one plunger of said pair to its normal off position, and a stronger spring biasing the other plunger of said pair to its normal off position whereby said plungers are responsive to different pressures in said reaction chamber to take up said lost motion connections to oppose movement of said second plunger.

14. A mechanism according to claim 10 wherein said reaction plunger means comprises a pair of coaxial plungers one slidable in the other, a sleeve in which said other plunger of said pair is slidable, said other plunger of said pair terminating short of said one plunger in said reaction chamber to provide an annular space, a double-lipped seal in said space seated against the adjacent end of said other plunger of said pair and slidably engaging said sleeve and the inner plunger of said pair, a first spring engaged at its ends with the inner plunger of said pair and against said second plunger to bias such plungers to their normal positions, a stronger spring biasing the outer plunger of said pair to its normal position, there normally being lost motion connection between the plungers of said pair and said second plunger, a deformable seal surrounding said second plunger, and means for maintaining a body of hydraulic fluid in said intermediate chamber.

15. A booster mechanism comprising a motor, a control mechanism connected between said motor and a power source, a pressure chamber, a fluid displacing element connected to said motor and operable in said chamber to displace fluid therefrom to perform work, a cylinder, a first plunger, a second plunger and reaction plunger means all arranged in said cylinder, said first and second plungers being spaced to form a hydraulic chamber, means connecting said hydraulic chamber to said pressure chamber, such means comprising a port opening into said pressure chamber adjacent said fluid displacing element to be closed upon initial movement of the latter from a normal off position, said second plunger and said reaction plunger means being spaced to form an intermediate chamber in which hydraulic fluid is maintained, a reaction chamber in the end of said cylinder opposite said first plunger and connected to said pressure chamber, said reaction plunger means being exposed to said reaction chamber, said second plunger being movable by pressure in said hydraulic chamber toward said reaction plunger means, means biasing said reaction plunger means away from said second plunger, said reaction plunger means being movable toward and engageable with said second plunger under the influence of hydraulic pressure in said reaction chamber to oppose such movement of said second plunger, and operating means connected between said second plunger and said control mechanism to operate the latter and connect said motor to said power source upon movement of said second plunger.

16. A mechanism according to claim 15 wherein said motor is a differential fluid pressure motor and said control mechanism is a follow-up valve mechanism, said operating means comprising a lever connected between said second plunger and said valve mechanism.

17. A booster mechanism comprising a motor, a control mechanism connected between said motor and a power source, a pressure chamber, a fluid displacing element connected to said motor and operable in said chamber to displace hydraulic fluid therefrom to perform work, a cylinder, manually operable plunger means comprising a control plunger slidable in said cylinder, reaction plunger means in said cylinder spaced from said control plunger to form a hydraulic chamber in which hydraulic fluid is maintained, a reaction chamber in said cylinder connected to said pressure chamber, said reaction plunger means being exposed to said reaction chamber, said control plunger being manually movable toward said reaction plunger means, means biasing said reaction plunger means away from said control plunger, said reaction plunger means being movable toward and engageable with said control plunger under the influence of hydraulic pressure in said reaction chamber to oppose such movement of said control plunger, a lateral passage through said cylinder, and an operating lever projecting through said passage, one end of said lever engaging said control plunger and the other end engaging said control mechanism to operate the latter and connect said motor to said power source upon movement of said control plunger.

18. A booster mechanism comprising a cylinder, a control plunger slidable therein, an actuating plunger slidable in said cylinder and spaced from said control plunger to form a hydraulic chamber in which pressure is generated by movement of said actuating plunger to move said control plunger, reaction plunger means in said cylinder at the end thereof opposite said actuating plunger and forming with said control plunger an intermediate chamber, means biasing said reaction plunger means to a normal position disengaged from said control plunger, a reaction chamber in the end of said cylinder adjacent said reaction plunger means, a motor, a control mechanism connected between said motor and a source of power therefor, means projecting into said intermediate chamber and engaging and operable by said control plunger, such means being connected to said control mechanism to operate it, a hydraulic pressure cylinder, a power plunger movable in such cylinder and connected to said motor to be operated thereby to generate pressure in said hydraulic pressure cylinder for the performance of work, and means connecting said hydraulic pressure cylinder to said reaction chamber to transmit pressures to the latter to operate said reaction plunger means to oppose movement of said control plunger from its normal off position.

19. A booster mechanism comprising a cylinder, a control plunger slidable therein, an actuating plunger slidable in said cylinder and spaced from said control plunger to form a hydraulic chamber in which pressure is generated by movement of said actuating plunger to move said control plunger, means forming with said control plunger and said cylinder a second chamber, a fluid pressure motor, a control valve mechanism laterally offset from said cylinder and connected between said motor and sources of different pressures, said control valve mechanism having a control chamber, a passage connecting said control chamber to said second chamber, a lever projecting through said passage and having connection at opposite ends with said control plunger and with said valve mechanism to operate the latter upon movement of said control plunger, a hydraulic pressure cylinder, a power plunger movable in such cylinder and connected to said motor to be operated thereby to generate pressure in said hydraulic cylinder for the performance of work, and means connected between said hydraulic pressure cylinder and said first-named cylinder for utilizing pressures in said hydraulic cylinder for reacting against valve operating movement of said control plunger.

20. A mechanism according to claim 19 wherein said means for reacting against movement of said control plunger comprises a reaction chamber connected to said hydraulic pressure chamber, and means exposed to pressure in said reaction chamber and having mechanical connection with said control plunger.

No references cited.